United States Patent
Jackson et al.

(10) Patent No.: US 10,805,656 B1
(45) Date of Patent: Oct. 13, 2020

(54) CONTENT RESTRICTION SYSTEM

(75) Inventors: Dean Kenneth Jackson, Pittsburgh, PA (US); Daniel Victor Klein, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 1171 days.

(21) Appl. No.: 13/536,879

(22) Filed: Jun. 28, 2012

(51) Int. Cl.
*H04N 21/258* (2011.01)
*H04H 60/73* (2008.01)
*H04N 21/472* (2011.01)

(52) U.S. Cl.
CPC ....... *H04N 21/25841* (2013.01); *H04H 60/73* (2013.01); *H04N 21/47202* (2013.01)

(58) Field of Classification Search
None
See application file for complete search history.

(56) References Cited

U.S. PATENT DOCUMENTS

| | | | | |
|---|---|---|---|---|
| 5,619,274 A * | 4/1997 | Roop et al. | | 348/461 |
| 6,016,141 A * | 1/2000 | Knudson | | H04N 5/44543 348/E5.105 |
| 6,108,365 A * | 8/2000 | Rubin et al. | | 375/130 |
| 8,037,168 B2 * | 10/2011 | Schneider | | 709/224 |
| 8,578,416 B1 * | 11/2013 | Radloff et al. | | 725/41 |
| 8,751,317 B2 * | 6/2014 | Qawami et al. | | 705/21 |
| 2003/0126594 A1 * | 7/2003 | Tsuria et al. | | 725/25 |
| 2003/0200313 A1 * | 10/2003 | Peterka et al. | | 709/225 |
| 2005/0266833 A1 * | 12/2005 | Walker | | 455/414.1 |
| 2006/0265243 A1 * | 11/2006 | Racho et al. | | 705/1 |
| 2007/0076872 A1 * | 4/2007 | Juneau | | 380/202 |
| 2007/0276926 A1 * | 11/2007 | LaJoie et al. | | 709/219 |
| 2008/0163286 A1 * | 7/2008 | Rudolph | | H04N 21/4751 725/28 |
| 2008/0200154 A1 * | 8/2008 | Maharajh et al. | | 455/414.3 |
| 2009/0178073 A1 * | 7/2009 | Tsuria | | H04N 7/165 725/28 |
| 2009/0235315 A1 * | 9/2009 | Sharkey et al. | | 725/68 |
| 2010/0024017 A1 * | 1/2010 | Ashfield | | G06F 21/35 726/7 |
| 2011/0041147 A1 * | 2/2011 | Piepenbrink et al. | | 725/28 |
| 2011/0041149 A1 * | 2/2011 | Piepenbrink et al. | | 725/28 |
| 2011/0055866 A1 * | 3/2011 | Piepenbrink et al. | | 725/40 |

(Continued)

OTHER PUBLICATIONS

Wikipedia, the free encyclopedia, "Major League Baseball blackout policy", downloaded from the internet on Jul. 6, 2016, https://en.wikipedia.org/wiki/Major_League_Baseball_blackout_policy, 4 pages.

*Primary Examiner* — Patrick McAtee
*Assistant Examiner* — Jason B Fenstermacher
(74) *Attorney, Agent, or Firm* — Lowenstein Sandler LLP

(57) ABSTRACT

A system and method for restricting access to content is disclosed. The system comprises a communication module, a rules module, a geolocation module, and a blackout module. The communication module receives a request for content and location data describing the geographic location of a client. The request includes content data identifying the content. The rules module determines a blackout rule for the content based at least in part on the content data. The geolocation module determines the geographic location of the client based at least in part on the location data. The blackout module determines whether to restrict access to the content based at least in part on the geographic location of the client and the blackout rule.

13 Claims, 8 Drawing Sheets

(56) References Cited

U.S. PATENT DOCUMENTS

2012/0174150 A1* 7/2012 Reddy et al. .................. 725/31
2012/0254432 A1* 10/2012 Roseborough et al. ...... 709/226
2012/0290421 A1* 11/2012 Qawami et al. ............... 705/21
2013/0191928 A1* 7/2013 Yin et al. ........................ 726/27
2013/0260796 A1* 10/2013 Hasek ........................ 455/456.3

* cited by examiner

CONTENT RESTRICTION SYSTEM

BACKGROUND

The specification relates to a content restriction system. In particular, the specification relates to a system and method for restricting access to content.

Events that are broadcast on cable or satellite television are frequently blacked out if certain conditions are not met. For example, a sporting event is blacked out in a certain geographic area if the game does not sell out in that geographic area. It would be desirable to be able to blackout online content such as videos and streams accessible on online services. However, existing systems fail to provide a way to blackout such online content.

SUMMARY OF THE INVENTION

The specification overcomes the deficiencies and limitations of the prior art at least in part by providing a system and method for restricting access to content. The system comprises a communication module, a rules module, a geolocation module, and a blackout module. The communication module receives a request for content and location data describing the geographic location of a client. The request includes content data identifying the content. The rules module determines a blackout rule for the content based at least in part on the content data. The geolocation module determines the geographic location of the client based at least in part on the location data. The blackout module determines whether to restrict access to the content based at least in part on the geographic location of the client and the blackout rule.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
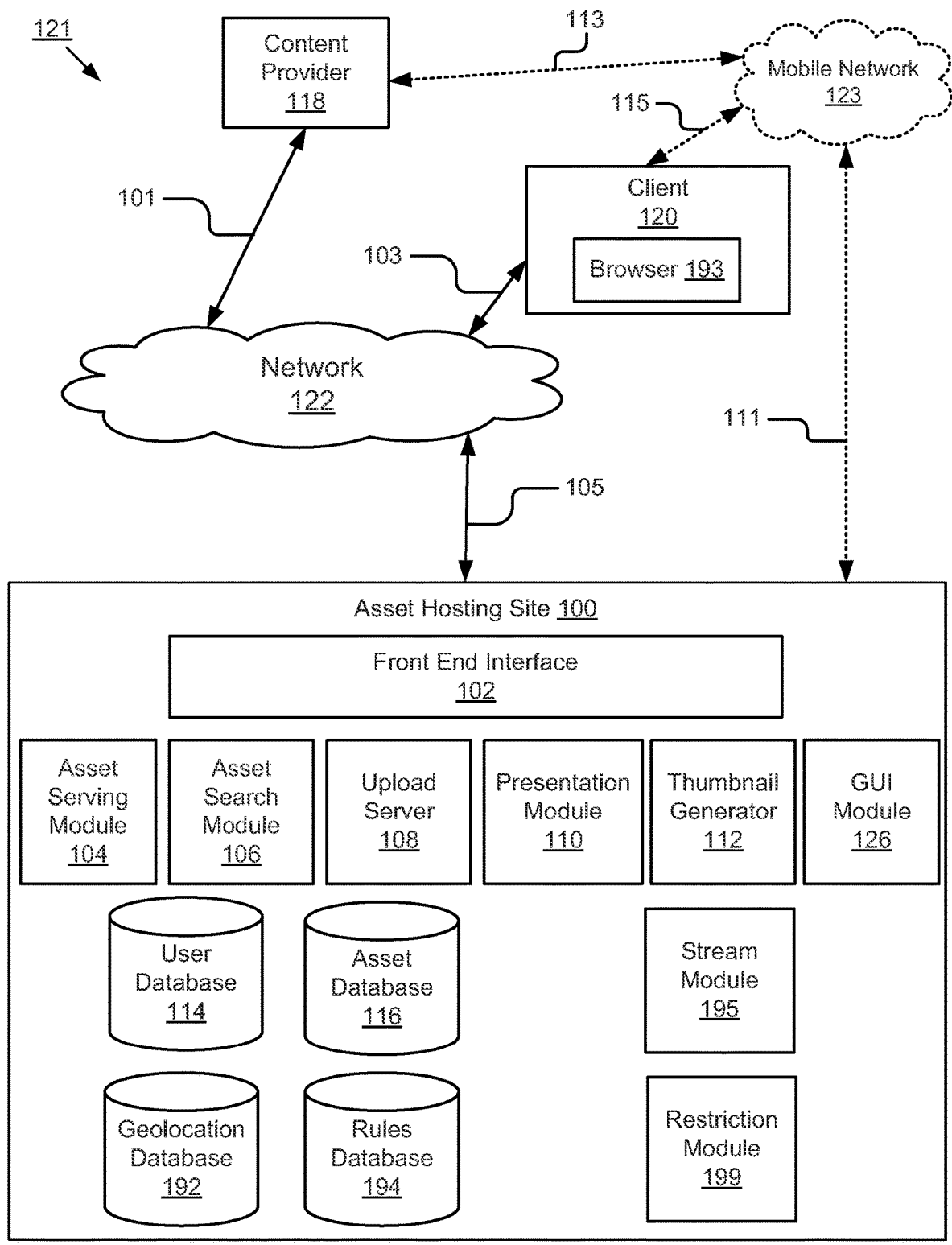
FIG. 1 is a high-level block diagram illustrating a system for restricting access to content according to one embodiment.

A system and method for restricting content is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code for deriving associations between assets will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 is a high-level block diagram illustrating a system 121 for restricting content according to one embodiment. The illustrated embodiment of the system 121 includes an asset hosting site 100, a content provider 118 and a client 120. These entities of the system 121 are communicatively coupled via a network 122. In one embodiment, one or more of these entities are communicatively coupled by a mobile network 123. Although only one content provider 118 and client 120 are illustrated, one skilled in the art will recognize that any number of content providers 118 and clients 120 can be communicatively coupled to the network 122 or the mobile network 123. Furthermore, while only one network 122 is coupled to the content provider 118, the asset hosting site 100 and the client 120, one skilled in the art will appreciate that any number of networks 122 can be connected to these entities shown in FIG. 1. Similarly, while only one mobile network 123 is coupled to the content provider 118, the asset hosting site 100 and the client 120, one skilled in the art will appreciate that any number of networks 122 can be connected to these entities shown in FIG. 1.

The network 122 is a conventional type of network, wired or wireless, and may have any number of configurations such as a star configuration, token ring configuration or other configurations known to those skilled in the art. In one embodiment, the network 122 comprises one or more of a local area network (LAN), a wide area network (WAN) (e.g., the Internet), and/or any other interconnected data path across which multiple devices communicate. In another embodiment, the network 122 is a peer-to-peer network. The network 122 is coupled to or includes portions of a telecommunications network for sending data in a variety of different communication protocols. For example, the network 122 is a 3G network or a 4G network. For example, the network 122 is coupled to the mobile network 123. In yet another embodiment, the network 122 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 122 are encrypted using conventional encryption technologies such as secure sockets layer (SSL), secure HTTP and/or virtual private networks (VPNs).

In the illustrated embodiment, the asset hosting site 100 is communicatively coupled to the network 122 via signal line 105. The client 120 is communicatively coupled to the network 122 via signal line 103. The content provider 118 is communicatively coupled to the network 122 via signal line 101.

The mobile network 123 is a conventional type of wireless network, and may have any number of configurations such as a star configuration, token ring configuration or other configurations known to those skilled in the art. For example, the mobile network 123 is a 3G or 4G network. In the illustrated embodiment, the asset hosting site 100 is communicatively coupled to the mobile network 123 via signal line 111. The client 120 is communicatively coupled to the mobile network 123 via signal line 115. The content provider 118 is communicatively coupled to the mobile network 123 via signal line 113. In one embodiment, the network 122 is communicatively coupled to the mobile network 123 and one or more of the content provider 118, the client 120 and the asset hosting site 100 are communicatively coupled to the mobile network 123 via the network 122.

The asset hosting site 100 is any system that allows a user to access an intellectual property asset via searching and/or browsing interfaces. An example of an asset hosting site 100 is the YOUTUBE™ website, found at www.youtube.com. Other asset hosting sites are known as well, and are adapted to operate according to the teachings disclosed herein. It will be understood that the term "website" represents any computer system adapted to serve content using any internet working protocols, and is not intended to be limited to content uploaded or downloaded via the Internet or the HTTP protocol.

In one embodiment, the asset hosting site 100 is configured to receive and share all or a portion of an intellectual property asset. Examples of an intellectual property asset include, but are not limited to a composition, an audio recording, a music video, etc. Those skilled in the art will recognize that an intellectual property asset can be represented in any media type and/or file type. For example, the asset hosting site 100 shares intellectual property assets such as a text file (e.g., one or more compositions of songs), an audio file (e.g., one or more audio recordings of songs), a video file and a file that includes a combination of video and audio (e.g., one or more videos such as music videos), etc. A file that includes a combination of video and audio is referred to as an "audio-video file" hereinafter. An intellectual property asset is referred to as "an asset," "an asset file," "content" or "a content file" hereinafter.

In one embodiment, sources of assets provided by the asset hosting site 100 are from uploads of assets by users (e.g., record labels, personal users, etc.), searches or crawls of other web sites or databases of assets, or the like, or any combination thereof. For example, in one embodiment, an asset hosting site 100 is configured to allow uploads of assets by users. In another embodiment, the asset hosting site 100 is configured to only obtain assets from other sources by crawling such sources or searching such sources in real time.

In the illustrated embodiment, the asset hosting site 100 includes: a front end interface 102; an asset serving module 104; an asset search module 106; an upload server 108; a presentation module 110; a thumbnail generator 112; a graphical user interface module 126 ("GUI module 126"); a user database 114; an asset database 116; a geolocation database 192; a rules database 194; a stream module 195; and a restriction module 199.

The components of the asset hosting site 100 are communicatively coupled to each other. For example, the components are communicatively coupled to one another via a bus (not pictured). Other conventional features, such as firewalls, load balancers, authentication servers, application servers, failover servers, site management tools, and so forth are not shown so as not to obscure the feature of the system.

In one embodiment, the illustrated components of the asset hosting website 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the asset hosting site 100 are performed by clients 120 or other entities in other embodiments if appropriate. In one embodiment, the functionality attributed to a particular component is performed by different or multiple components operating together.

In one embodiment, each of the various servers and modules is implemented as a server program executing on a server-class computer comprising one or more central processing units ("CPU," or "CPUs" if plural), memory, network interface, peripheral interfaces, and other well-known components. The computers themselves preferably run an open-source operating system such as LINUX, have generally high performance CPUs, 1 gigabyte or more of memory, and 100 gigabyte or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in tangible computer accessible storage mediums (e.g., random access memory ("RAM"), flash, hard disk, optical/magnetic media, or solid-state drive ("SSD"), etc.).

The front end interface 102 is an interface that handles communication with one or more of the content provider 118 and the client 120 via the network 122 and/or the mobile network 123. For example, the front end interface 102 receives an asset uploaded from the content provider 118 and delivers the asset to the upload server 108. In one embodiment, the front end interface 102 receives requests from users operating on the client devices 120 and delivers the requests to the other components of the asset hosting site 100 (e.g., the asset search module 106 or the asset serving module 104). For example, the asset is a video and the front end interface 102 receives a video search query from a user and sends the video search query to the asset search module 106.

The upload server 108 receives one or more assets from the content provider 118 via the front end interface 102. For example, the upload server 108 receives one or more of a text file, an audio-video file and an audio file from the content provider 118. In one embodiment, the upload server 108 processes the one or more assets and stores the processed assets in the asset database 116. The upload server 108 assigns an asset identifier ("asset ID") to the stored asset. For example, the upload server 108 assigns an identifier to a file for a music video ("music video ID") and stores the music video together with the music video ID in the asset database 116. In other embodiments, the upload server 108 performs one or more of: formatting an asset; compressing an asset; metadata tagging an asset; content analysis; and fingerprinting an asset, etc.

In one embodiment, the asset is a content stream and the asset ID is a universal resource locator ("URL") identifying the content stream. For example, the asset is a live stream and the asset ID is a URL pointing to the live stream. Assume, in this example that the content provider 118 is a server hosting a live stream of a sporting event. In this example the asset is a live stream for the sporting event. The asset ID is a URL pointing to the live stream for the sporting event. The content provider 118 uploads the URL to the upload server 108. As will be described in more detail below with reference to the restriction module 199, in one embodiment the content provider 118 uploads rules to the upload server 108 specifying conditions that must be met before a client 120 can access the stream.

The asset database 116 is a storage system that stores assets shared by the asset hosting site 100 with the users. In one embodiment, the asset database 116 stores the assets processed by the upload server 108. In another embodiment, the asset database 116 also stores metadata associated with the assets. The metadata includes one or more of: a content type of the asset (e.g., an audio file, a video file, an audio-video file, a content stream, etc.); an owner of the asset; a title; a description; tag information; a time length; and the like. In one embodiment, some or all of the metadata of the assets is provided by the content provider 118. For example, a user of the content provider 118 provides a title, a description and a content type of an asset when uploading the asset to the asset hosting site 100. In one embodiment, the asset database 116 acts as a buffer to temporarily store a content stream that can be provided to the client 120. In one embodiment, the stream module 195 includes a buffer (not pictured) for buffering content stream. In one embodiment, the assets stored by the asset database 116 are referred to as "content" or "content files."

In one embodiment, the asset is a content stream and the asset database 116 stores a URL identifying the content stream. For example, the content provider is a hardware server and the content stream is a live stream hosted by the content provider 118. The asset ID is a URL identifying the content stream. The URL identifying the content stream is stored on the asset database 116. In one embodiment, the asset database 116 stores an association between the URL and a description of the content stream. For example, the description of the content stream includes one or more keywords that describe the content stream. The keywords can be used to search the asset database 116 and retrieve the URL pointing to the content stream. Searching the asset database 116 is described in further detail below with reference to the asset search module 106.

The asset search module 106 includes code and routines that, when executed by a processor (not pictured), processes any search queries received by the front end interface 102 from users. A search query received by the front end interface 102 from a user includes search criteria such as keywords that identify an asset the user is interested in. The asset search module 106 uses the search criteria to query the metadata of the asset stored in the asset database 116. The search results for the query are returned to the front end interface 102 for presentation to the user. For example, if a user provides the front end interface 102 with a keyword search query, the asset search module 106 identifies an asset stored in the asset database 116 related to the keyword and returns the search result (e.g., asset IDs and/or metadata such as titles, descriptions, thumbnails of the identified assets) to the front end interface 102.

The asset serving module 104 includes code and routines that, when executed by a processor (not pictured), processes requests for an asset (e.g., a composition, audio recording, music video, any other type of video, etc) and provides the asset to users. For example, the asset serving module 104 receives a query from a user via the front end interface 102, retrieves a set of music videos from the asset database 116 based at least in part on the query and presents the set of music videos to the user via the front end interface 102.

In one embodiment, the asset serving module 104 receives a request from a user to access an asset when the user clicks on a link to the asset. The request received from the user includes the asset ID of the asset that the user wishes to access. In one embodiment, the asset ID is included automatically in the request once the user clicks on the link for the asset. The asset serving module 104 uses the asset ID to search and locate the asset in the asset database 116. Once the requested asset is located, the asset serving module 104 transmits the asset to the user via the front end interface 102. The asset is presented to the user on a web page. Metadata associated with the asset is also presented with the asset, such as the title and description of the asset. In one embodiment, the asset serving module 104 stores the asset ID of the asset in the user database 114 after sending the asset to the user so that an asset access history of the user is stored in the user database 114.

The user database 114 is a storage system that stores data and/or information associated with a user. For example, the user database 114 stores the asset IDs of assets uploaded by a user to the asset hosting site 100 and the asset IDs of assets that the user has accessed from the asset database 116. In one embodiment, the user is identified by using a login name and password and/or by using the user's internet protocol ("IP") address. In one embodiment, the IP address is stored in the geolocation database 192. In one embodiment, the client 120 is a mobile device such as a smart phone, a mobile phone or a tablet computing device that stores and executes a telephone software application, and the user database 114 stores telephone numbers for the client 120. In one embodiment, the user is provided with an opportunity to opt in to having their telephone number stored by the asset hosting site 100 so that the asset hosting site 100 does not store the telephone number unless such storage has been authorized by the user. In one embodiment, the telephone number is stored in the geolocation database 192.

The thumbnail generator 112 includes code and routines that generates a thumbnail for an asset. A thumbnail is a picture that represents an asset in the asset hosting site 100. For example, assume the asset is a video (e.g., a movie or a live stream). The thumbnail generator 112 analyzes the video and selects a frame of the video as the thumbnail. In one embodiment, the thumbnail generator 112 provides one or more pictures for the video and the user uploading the video to the asset hosting site 100 selects one picture as the thumbnail.

The GUI module 126 includes code and routines that, when executed by a processor (not pictured), generates graphical data for providing a GUI used by a human user to input information to the system 121. For example, the GUI module 126 generates graphical data for providing a GUI to the client 120, allowing a human user operating on the client 120 to provide a payment to the asset hosting site 100 to cause a blackout event to end (e.g., steps 440, 445, 450 and 455 as described below with reference to FIGS. 4A and 4B). In one embodiment, the GUI module 126 stores the generated graphical data in the graphical database (not pictured).

In one embodiment, the GUI module 126 is configured to transmit the graphical data to the front end interface 102. The front end interface 102 communicates with the network 122 and/or the mobile network 123 to transmit the graphical data to a processor-based computing device communicatively coupled to the network 122 and/or the mobile network 123. For example, the front end interface 102 transmits the graphical data to one or more of the content provider 118 and the client 120. The processor-based computing device receives the graphical data and generates a GUI displayed on a display device (e.g., a monitor) communicatively coupled to the processor-based computing device. The GUI is displayed on the display device and viewed by a human user operating on the processor-based computing device.

In one embodiment, the graphical data is stored on a memory associated with the asset hosting site 100. For example, the graphical data is stored on a computer readable storage medium (e.g., a hard drive, flash drive, database, etc.) communicatively coupled to the asset hosting site 100. In one embodiment, the graphical data is stored on one or more of the user database 114, the asset database 116, the geolocation database 192 and the rules database 194.

The geolocation database 192 is a non-transitory computer-readable storage medium that stores any data necessary for the geolocation module 203 to perform its function. The geolocation module 203 is described in more detail below with reference to FIG. 2 (element 203), FIG. 3 (step 315), FIG. 4A (step 410) and FIGS. 5A and 5B (steps 505 through 550). For example, the geolocation database 192 stores data necessary for the geolocation module 203 to determine the geographic location of a client 120. In one embodiment, the geolocation database 192 stores the information necessary to determine a geographic location of a client 120 based at least in part on the IP address assigned to the client 120.

Persons having ordinary skill in the art will understand that in some embodiments the client 120 is a mobile device that is enabled to include Global Positioning System ("GPS") functionality. In one embodiment, the client 120 is a mobile device such as a GPS-enabled phone, smart phone or tablet computing device and the geolocation database 192 stores the information necessary to determine a geographic location of a client 120 based at least in part on GPS coordinates provided by the user of the client 120. In one embodiment, the user of the client 120 must opt in to having their location determined based on GPS coordinates (e.g., step 515 in FIG. 5A) so that the asset hosting site 100 does not have information describing the GPS coordinates of the client 120 unless this has been authorized by the user of the client 120.

The rules database 194 is a non-transitory computer-readable storage medium that stores any data necessary for the rules module 205 to perform its function. The rules module 205 is described in more detail below with reference to FIG. 2 (element 205), FIG. 3 (step 315) and FIG. 4A (steps 415, 420). For example, the rules database 194 stores data describing a blackout rule and a time rule for a content file. The blackout rule and the time rule are specified by the content provider 118. For example, the content provider 118 uploads content to the asset hosting site 100. The GUI module 126 generates a GUI that includes graphics for enabling the user of the content provider 118 to specify a blackout rule and, optionally, a time rule. The blackout rule and the time rule are then stored in the rules database 194.

A blackout rule is data that specifies a content file that cannot be provided to a client 120 if the client 120 is located in a certain geographic location specified by the content provider 118. In one embodiment, the blackout rule specifies content file that cannot be provided to a client 120 if the client 120 is located in a certain geographic location specified by the content provider 118 and/or if other conditions specified by the content provider 118 are not met.

For example, the content file is a content stream for a sporting event. The sporting event is being played in a particular geographic location. The content provider 118 uploads a URL for the sporting event to the asset hosting site 100 and specifies a blackout rule describing a certain number of tickets that must be sold for the sporting event in order for the content stream to be provided to clients 120 located in the geographic location associated with the sporting event. Assume, for example, that the sporting event is a minor league baseball game being played in Pittsburgh, Pa. The home team for the game of the teams is a Pittsburgh baseball team. The away team for the baseball game is a franchise located in Mountain View, Calif. The content provider 118 is the owner of a league or one of the teams playing in the baseball game. The content provider 118 specifies that the game must sell out in order for the content stream for the game to be provided to clients 120 located in Pittsburgh. In other words, if the game does not sell out it is blacked out for clients 120 located in Pittsburgh (or approximately located in Pittsburgh). Such clients 120 and users are described herein as "blacked out clients" or "blacked out users," respectively. As described below with reference to the payment module 209, in one embodiment users of clients 120 who are blacked out have the option to pay a fee in order to have the blackout lifted. For example, the fee is the price of a ticket to the baseball game plus a fee that goes to the owner of the asset hosting site 100.

The time rule is data that describes how long a blacked out client 120 is unable to view the stream. An example of the time rule is described below with reference to FIG. 4B's steps 450 and 455.

The restriction module 199 includes codes and routines for restricting access to content stored in the asset database 116 based at least in part on the geographic location of a client 120 that has requested the content and the rules stored in the rules database 194. The restriction module 199 is described in more detail below with reference to FIGS. 2, 3, 4A, 4B, 5A and 5B.

The stream module 195 includes code and routines for receiving a content stream provided by a content provider 118 and providing the content stream to a client 120. For example, the content provider 118 provides a live stream for a sporting event to the asset hosting site 100. The front end interface 102 receives a request for the live stream of the sporting event. The front end interface 102 relays this request to the restriction module 199. The restriction module 199 determines the application of a blackout rule. The restriction module 199 communicates with the stream module 195 to indicate when the client 120 is eligible to receive the stream. The stream module 195 communicates with the front end interface 102 to provide the stream to the client 120 via the network 122 or the mobile network 123. In one embodiment, the stream module 195 includes a buffer (not pictured) for buffering a stream.

The content provider 118 is any device that provides assets to the asset hosting site 100. For example, the content provider 118 is a computing device that uploads an asset to the asset hosting site 100.

In one embodiment, the content provider 118 is configured to operate a computing device to perform various content provider functions. Examples of the content provider functions include, but are not limited to: uploading an asset to the asset hosting site 100; specifying a blackout rule for the content; and specifying a time rule for the content.

In one embodiment, the content provider 118 is a hardware server configured to host a content steam.

The client 120 is any processor-based computing device. The client 120 executes client software such as a web browser 193 or built-in client application and connects to the asset hosting site 100 via the network 122 and/or the mobile network 123. In one embodiment, the client 120 includes a variety of different computing devices. Examples of a client device 120 include, but are not limited to: a personal computer; a personal digital assistant; a tablet computer; a cell phone (e.g., a smart phone); and a laptop computer. The client 120 comprises a processor (not pictured), a memory (not pictured) and other components conventional to a computing device.

In one embodiment, the client 120 is a processor based computing device configured to provide content to a television or a monitor. For example, the client 120 is a set top box. Examines of suitable set top boxes include the Roku™ box and a gaming console such as the Sony Playstation™ that includes a module for providing content such as that provided by the asset hosting site 100. Those having skill in the art will appreciate that the set top boxes described above are exemplary, and that other types of set top boxes are possible.

In one embodiment, the client 120 is configured as a content provider 118 to provide assets to the asset hosting site 100. In another embodiment, the client 120 is configured to retrieve assets stored by the asset hosting site 100. For example, the client 120 includes an embedded video player (e.g., the Flash™ player from Adobe Systems, Inc.) adapted for the video content formats used in the asset hosting site 100 so that a user is able to view a video from the asset hosting site 100 using the embedded video player.

Restriction Module

Figure 2:
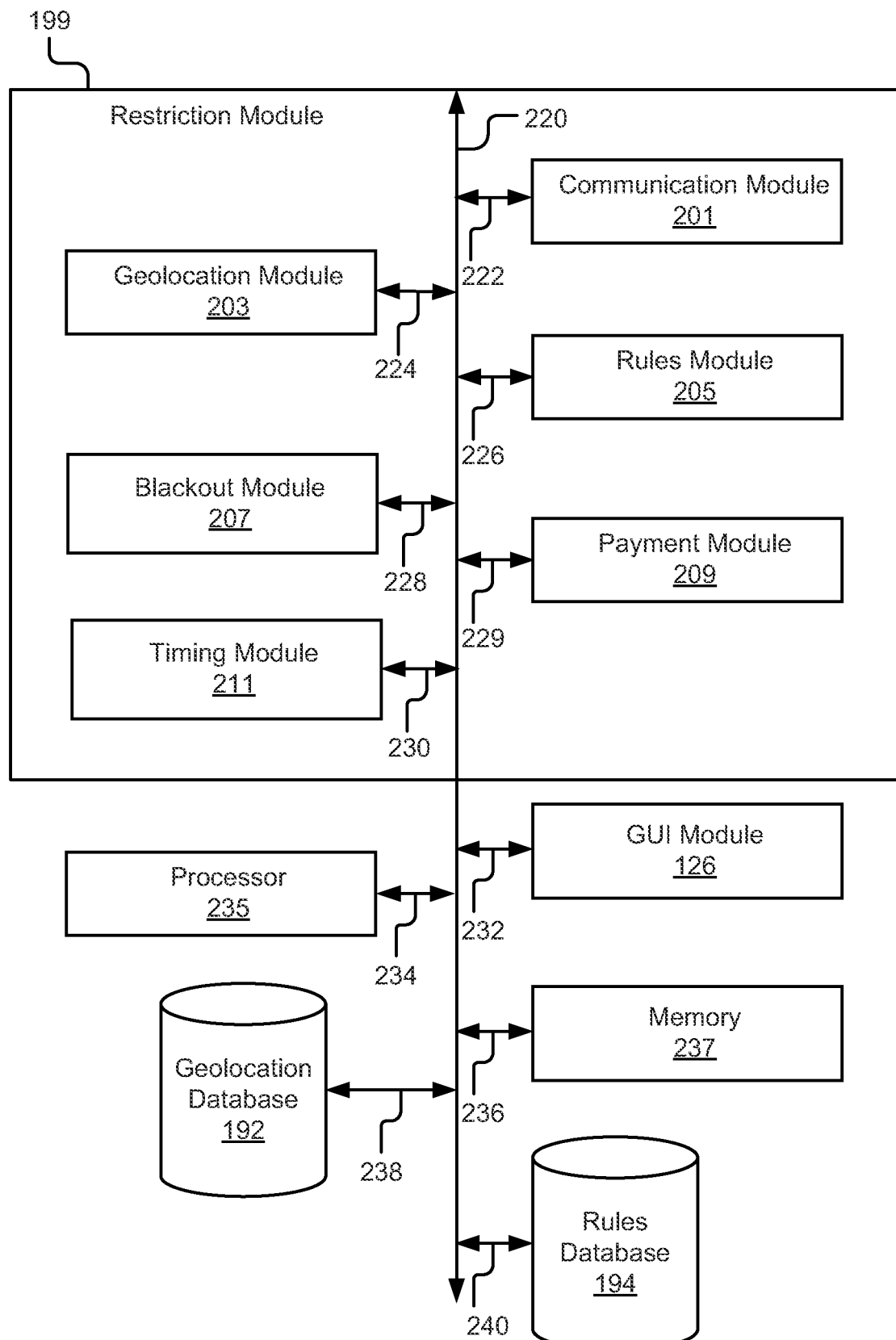
FIG. 2 is a block diagram illustrating a restriction module according to one embodiment.

Referring now to FIG. 2, the restriction module 199 is shown in more detail. FIG. 2 is a block diagram illustrating the restriction module 199 according to one embodiment. FIG. 2 depicts the restriction module 199, a processor 235, a memory 237, a GUI module 126, a geolocation database 192 and a rules database 194. These entities are communicatively coupled to a bus 220 for communication with each other.

The rules database 194, geolocation database 192 and GUI module 126 are described above with reference to FIG. 1. The rules database 194 is communicatively coupled to the bus 220 via signal line 240. The geolocation database 192 is communicatively coupled to the bus 220 via signal line 238. The GUI module 126 is communicatively coupled to the bus 220 via signal line 232.

The processor 235 comprises an arithmetic logic unit, a microprocessor, a general purpose controller or some other processor array to perform computations, retrieve data stored on the memory 237, etc. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 234.

The memory 237 stores instructions and/or data that are executed by the processor 235. The memory 237 is communicatively coupled by the bus 220 for communication with the other components of the restriction module 199. In one embodiment, the instructions and/or data comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. In one embodiment, the memory 237 serves as a buffer for the stream module 195. The memory 237 is communicatively coupled to the bus 220 via signal line 236.

The restriction module 199 comprises a communication module 201, a geolocation module 203, a rules module 205, a blackout module 207, a payment module 209 and a timing module 211. The components of the restriction module 199 are communicatively coupled to each other via the bus 220. In one embodiment, the restriction module 199 is implemented using hardware such as field-programmable gate arrays ("FPGAs") or application-specific integrated circuits ("ASICs"). One skilled in the art will recognize that the restriction module 199 may include different modules and/or components to provide the functionality described herein.

The communication module 201 includes code and routines that, when executed by the processor 235, handles communication between components of the restriction module 199 and other components of the asset hosting site 100. In the depicted embodiment, the communication module 201 is communicatively coupled to the bus 220 via signal line 222.

In one embodiment, the communication module 201 retrieves data from the geolocation database 192 and provides this data to the geolocation module 203. In another embodiment, the communication module 201 retrieves data from the rules database 194 and provides this data to the rules module 205 and, optionally, the timing module 211. In another embodiment, the communication module 201 stores data on the geolocation database 192 and the rules database 194 as instructed by the other components of the asset hosting site 100. For example, the content provider 118 provides rules associated with a content file, the front end interface 102 provides these rules to the communication module 201 and the communication module 201 stores these rules on the rules database 194.

The geolocation module 203 includes code and routines that, when executed by the processor 235, determines the geographic location of the client 120. For example, the geolocation module 203 receives location data from the client 120 describing the IP address for the client 120 and the geolocation module 120 determines the geographic location of the client 120 based on the IP address. In one embodiment, the geolocation database 192 stores data necessary to determine the geographic location of the client 120 based on the IP address.

In one embodiment, the location data includes a universal resource locator ("URL") and the geolocation module 120 determines the approximate geographic location of the client 120 based on a URL associated with the request for content sent by the client 120. For example, the URL includes data describing the location of the browser 193. In one embodiment, the URL includes sets of data that are used by the geolocation module 203 to determine the approximate location of the browser 193. For example, the geolocation module 203 parses the data from the URL and cross references the data against other data stored in the geolocation database 192 to determine the approximate geographic location of the browser 193.

In one embodiment, the location data includes an internet protocol address ("IP address") and the geolocation module 203 determines the approximate geographic location of the client 120 based on the IP address. For example, the client 120 is located in Vermont at a town near Lake George. The town is near the border of Vermont and New York. Because of this, the IP address assigned to the client changes periodically and sometimes incorrectly indicates that the client 120 is located in New York when it is in fact located in Vermont. The geolocation module 203 determines the approximate location of the client 120 based at least in part on the IP address. In one embodiment, the geolocation database 192 stores data necessary for the geolocation module 203 to determine the correct location of the client 120 based at least in part on the approximate location of the client 120 and the data stored in the geolocation database 192.

In one embodiment, the client 120 is a GPS-enabled mobile device such as a smart phone, mobile phone or tablet computing device. The user of the client 120 has opted in to a program associated with the asset hosting site 100 that allows the asset hosting site 100 to receive GPS coordinates describing the geographic location of the client 120. For example, the asset hosting site 100 is operated by Google™ and/or YouTube™, and the program is Google Latitude™. The client 120 transmits location data describing the GPS coordinates for the client 120 to the asset hosting site 100. The front end interface 102 receives the GPS coordinates. The communication module 201 communicates with the front end interface 102 and relays the GPS coordinates to the geolocation module 203. The geolocation module 203 determines the geographic location of the client 120 based at least in part on the GPS coordinates. In one embodiment, the geolocation module 203 determines the geographic location of the client 120 based at least in part on the GPS coordinates and data stored on the geolocation database 192. In another embodiment, the geolocation module 203 communicates with the communication module 201 to store the GPS coordinates in the geolocation database 192.

In one embodiment, the geolocation module 203 determines whether the client 120 is a mobile device based at least in part on the type of browser 193 used to transmit the request for content. Persons having ordinary skill in the art will appreciate that mobile devices uses different types of browsers when compared to other devices such as laptops and desktops, and that the browser type can be determined by analysis of a request transmitted to the asset hosting site 100. In another embodiment, the geolocation module 203 determines whether the client 120 is a mobile device based at least in part on a code that is transmitted to the client device 120. Examples of the geolocation module 203 determining whether the client 120 is a mobile device are described in more detail with reference to FIGS. 5A and 5B.

The geolocation module 203 is described in more detail with reference to FIGS. 3 (step 310), 4A (step 410) and FIGS. 5A and 5B. The geolocation module 203 is communicatively coupled to the bus 220 via signal line 224.

The rules module 205 includes code and routines that, when executed by the processor 235, determines a blackout rule and, optionally, a time rule for a client 120 request to access content. For example, the communication module 201 transmits data describing the geographic location of the client 120 and the asset ID for the content requested by the client 120 to the rules module 205. In one embodiment, different content files stored in the asset database 116 have different rules for different geographic locations. For example, the blackout rule for a particular content file only applies to a particular geographic area. Similarly, different content files have different time rules. The rules module 205 queries the rules database 194 using one or more of the geographic location and the asset ID to determine the blackout rule and the time rule for the content file so that the blackout rule and the time rule are determined based at least in part on the geographic location determined by the geolocation module 203 and the asset ID of the content requested by the user. The geolocation module 203 is described in more detail with reference to FIGS. 3 (step 315) and 4A (step 415). The rules module 205 is communicatively coupled to the bus 220 via signal line 226.

The blackout module 207 includes code and routines that, when executed by the processor 235, determines whether the blackout rule applies to the user request. For example, the requested content is a stream for a minor league baseball game being played in Pittsburgh, Pa. The home team for the game of the teams is a Pittsburghbaseball team. The away team for the baseball game is a franchise located in Mountain View, Calif. The content provider 118 has provided a blackout rule specifying that clients 120 located in Pittsburgh cannot access the stream unless the baseball game sells out. The game does not sell out. The client 120 requests access to the stream. The geolocation module 203 determines that the client 120 is located in Pittsburgh. The communication module 201 transmits location data describing the location of the client 120 to the rules module 205 and the blackout module 207. The rules module 205 determines the blackout rule based on the geographic location and the asset ID for the requested content. The communication module 201 transmits blackout data describing the blackout rule to the blackout module 207. The blackout module 207 determines based on the location data and the blackout data that the blackout rule applies to the user request to access the stream. In other words, the blackout module 207 determines to blackout the client 120 from accessing the stream (i.e., a blackout event). In this example, the client 120 has been blacked out from accessing a content file.

In one embodiment, the blackout module 207 communicates with the GUI module 126 to cause the GUI module to generate graphical data for displaying a blackout GUI on the client 120. The blackout GUI includes data notifying the user of the client 120 that the requested asset has been blacked out. As described below, in one embodiment the user of the client 120 has the option to pay to have the blackout event ended. The blackout module 207 is described in more detail with reference to FIGS. 3 (step 315) and 4A (step 420). The blackout module 207 is communicatively coupled to the bus 220 via signal line 228.

The payment module 209 includes code and routines that, when executed by the processor 235, determines whether a client 120 that has been blacked out from accessing a content file has the option to pay to remove the blackout. For example, a content provider 118 uploads content to the asset hosting site 100. The GUI module 126 transmits graphical data to the content provider 118, causing a rule GUI to be displayed on a display device communicatively coupled to the content provider 118. The rule GUI includes functionality to enable a user of the content provider 118 to specify a blackout rule, a time rule and a payment rule.

The payment rule specifies a payment rule for a blackout event and whether the blackout event can be ended responsive to the blacked out client 120 paying a fee. In one embodiment, the fee is specified by the user of the content provider 118 and/or an administrator of the asset hosting site 100. For example, assume that the payment rule specifies that a client 120 can pay a fee to end a blackout event. The blackout module 207 determines that a client 120 has been blacked out from accessing the content file, i.e., a blackout event. The payment module 209 causes the communication module 201 to retrieve a payment rule from the rules database 194. For example, the payment module 209 queries the rules database 194 using the asset ID and the location data. Responsive to this query, the rules database 194 returns a payment rule specifying that the client 120 can pay to end the blackout event. The payment module 208 determines based at least in part on the payment rule that the user of the client 120 can pay to end the blackout event.

In one embodiment, the payment module 209 causes the GUI module 126 to retrieve graphical data for causing the client 120 to display a payment GUI. The payment GUI is a GUI that includes functionality for enabling the user of the client 120 to transmit payment data (e.g., credit card information, bank account number and associated routing code, etc.) to the asset hosting site 100. The user of the client 120 uses the payment GUI to input and transmit the payment data to the asset hosting site 100. The front end interface 102 receives the payment data. The communication module 201 stores the payment data in a memory associated with the asset hosting site 100 and transmits a payment indication to the payment module 209 to indicate that payment has been received. The payment module 209 communicates with the blackout module 207 to cause the blackout event to end. The payment module 209 is described in more detail with reference to FIGS. 4A (step 430) and 4B (steps 447 through 465). The payment module 209 is communicatively coupled to the bus 220 via signal line 229.

The timing module 211 includes code and routines that, when executed by the processor 235, determines a time rule for a blackout event and whether the blackout event should be ended based at least in part on the time rule. In one embodiment, the timing module 211 determines the amount of time that has expired since the blackout event began. The time rule specifies that the blackout event should last a predetermined amount of time. The timing module 211 compares the time specified by the time rule to the time that has elapsed since the blackout event began. If the elapsed time equals or exceeds the amount of time specified by the time rule, the timing module 211 communicates with the blackout module 207 to end the blackout event.

In one embodiment, the content provider 118 specifies a time when the blackout event should end. For example, the time rule provided by the content provider 118 specifies a Unix time when the blackout event should end. In one embodiment, the time specified by the content provider 118 is converted to Unix time by the timing module 211. The timing module 211 determines the present Unix time. In one embodiment, the present Unix time is the time when step 470 of FIG. 4C occurs. For example, the present Unix time is any time after the blackout event has began. The timing module 211 compares the present Unix time to the time specified by the time rule. The timing module 211 determines whether the present Unix time is equal or subsequent in time to the Unix time associated with the time rule. If the timing module 211 determines that the present time is equal or subsequent to the time specified by the time rule, then the timing module 211 communicates with the blackout module 207 to end the blackout event.

In one embodiment, the communication module 201 receives a request for content. The request received by the communication module 201 does not include location data describing the geographic location of the client 120. Instead, the request includes content data identifying the content requested by the client 120. The rules module 205 determines a blackout rule for the content based at least in part on the content data. The rules module 205 determines, based at least in part on the blackout rule associated with the content, whether geographic restrictions apply to the requested content. For example, the blackout rule includes a bit of data indicating that the content provider 118 has specified geographic restrictions for the content. If geographic restrictions apply to the requested content the communication module 201 transmits a request to the client 120. The request includes a query for location data describing the geographic location of the client 120. The communication module 201 receives location data describing the geographic location of the client 120. The geolocation module 203 determines the geographic location of the client 120 based at least in part on the location data. The blackout module 207 determines whether to restrict access to the content based at least in part on the geographic location of the client 120 and the blackout rule.

Methods

Figure 3:
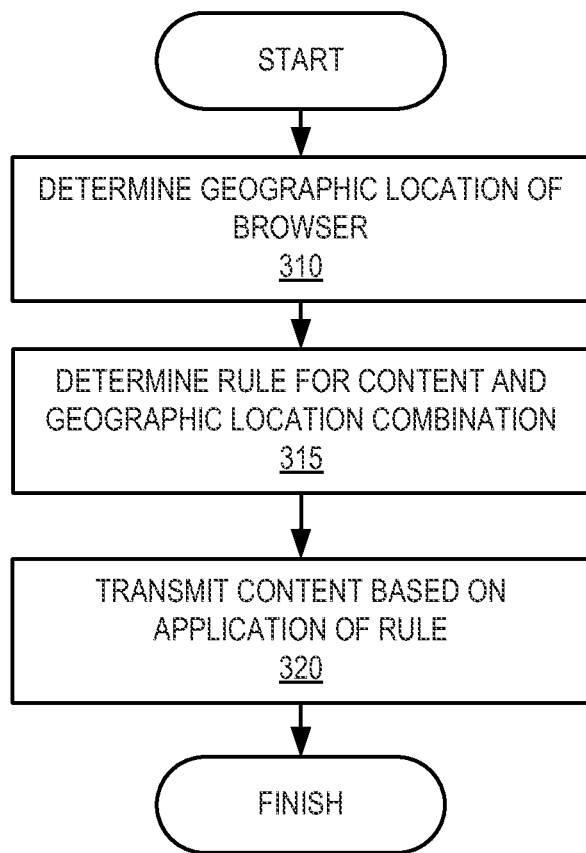
FIG. 3 is a flow diagram illustrating a method for restricting access to content according to one embodiment.

Referring now to FIGS. 3, 4A, 4B, 4C, 5A and 5B, various embodiments of the method in the specification are described. FIG. 3 is a flow diagram illustrating a method 300 for restricting content according to one embodiment. The front end interface 102 receives a request for content stored on the asset database 116. The request is sent by a client 120. The communication module 201 transmits request data and/or location data to one or more of the geolocation module 203, the rules module 205, the blackout module 207, the payment module 209 and the timing module 211. In one embodiment, the content data includes the asset ID associated with the content being requested by the client 120. In one embodiment, the content data describes a content file (e.g., a data file for a video stored on the asset database 116) or data for a content stream (e.g., a live stream). The location data includes data used by the geolocation module 203 to determine the geographic location of the client 120. The geolocation module 203 determines 310 the geographic location of the client 120 based at least in part on the location data.

In one embodiment, the requested content is a content stream and the content stream is identified by a URL identifying the content stream. Persons having ordinary skill in the art will appreciate that the content stream can be identified by other identifiers besides and URL. In another embodiment, the URL identifying the content stream is included in the request for content transmitted by the client 120. In one embodiment, the URL is the asset ID for the requested content stream.

In one embodiment, one or more of the blackout rule, the time rule and the payment rule for a given requested content are different based on the geographic location of the client 120 as determined by the geolocation module 203. Accordingly, in one embodiment the blackout rule is determined 315 based on the asset ID for the requested content and the geographic location of the client 120. The rules module 205 determines 315 a blackout rule associated with the requested content based at least in part on the asset ID and the geographic location determined by the geolocation module 203. The payment module 209 determines 315 the payment rule associated with the requested content based at least in part on the asset ID and the geographic location determined by the geolocation module 203. The timing module 211 determines 315 the time rule associated with the requested content based at least in part on the asset ID and the geographic location determined by the geolocation module 203. The asset hosting site 100 transmits 320 the requested content to the client 120 based at least in part on the application of the blackout rule, the payment rule and the time rule.

Figure 4A:
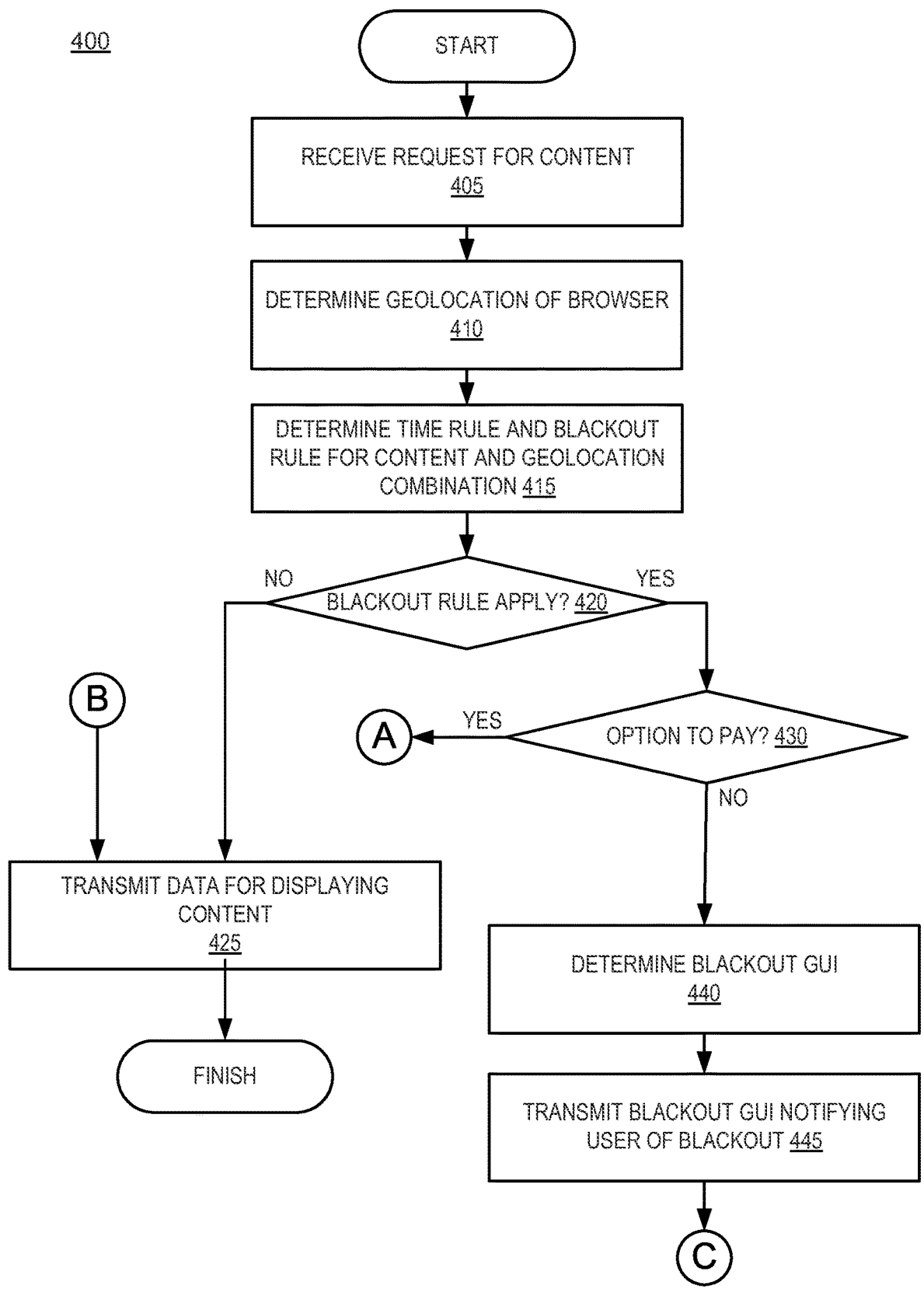
FIGS. 4A, 4B and 4C are flow diagrams illustrating a method for restricting access to content according to another embodiment.
Figure 4B:
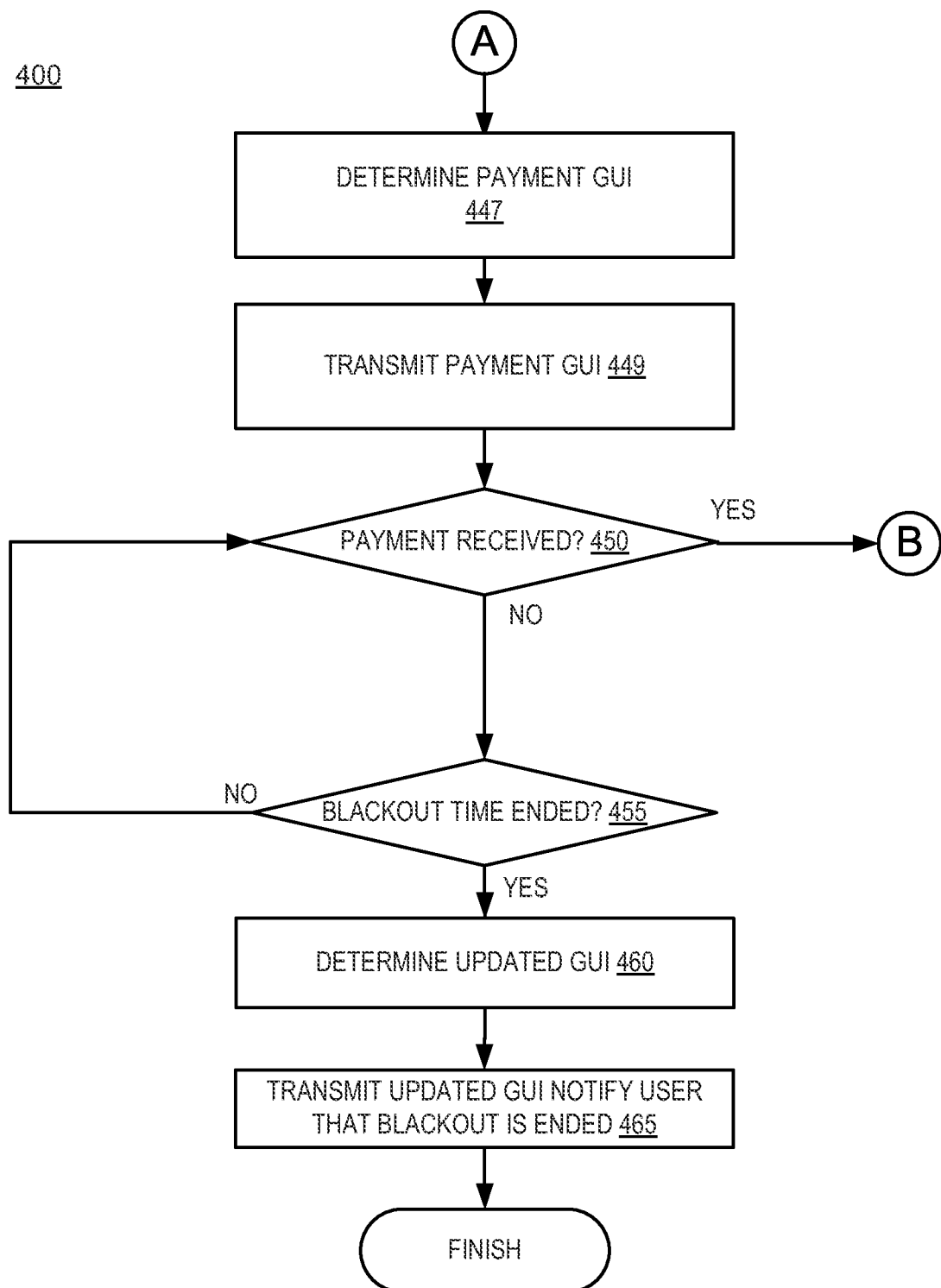
Figure 4C:
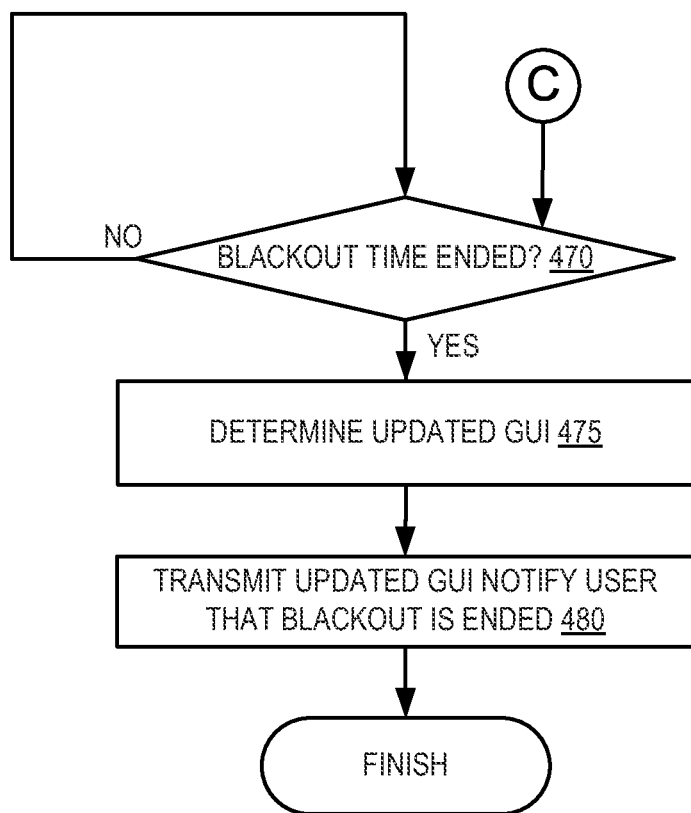

FIGS. 4A, 4B and 4C are flow diagrams illustrating a method 400 for restricting content according to another embodiment. The communication module 201 receives 405 a request for content. The geolocation module 203 determines 410 the geographic location of the browser 193. At step 415 the rules module 205 determines the time rule and the blackout rule for the content being requested by the client 120 and the geographic location of the client 120.

At step 420 the blackout module 207 determines whether the blackout rule applies 420. If the blackout rule does not apply, then the method 400 moves to step 425 and the asset hosting site 100 transmits the data for displaying the requested content at the client 120.

If the blackout rule applies, then the method 400 moves to step 430 and the payment module 209 determines whether the client 120 has the option to pay to end the blackout.

If the client 120 does not have the option to pay, then the method moves to step 440. At step 440 the GUI module 126 determines graphical data for causing the client 120 to display the blackout GUI. At step 445 the asset hosting site 100 transmits the graphical data determined at step 440 to the client 120.

If at step 430 the client has the option to pay to end the blackout, then the method moves to step 447 depicted in FIG. 4B. At step 447, the GUI module 126 determines graphical data for causing the client 120 to display the payment GUI. At step 449 the asset hosting site 100 transmits the graphical data determined at step 447 to the client 120. At step 450 the payment module 209 determines whether payment has been received. If the payment is received, then the method 400 moves to step 425 and the asset hosting site 100 transmits the data for displaying the content to the client 120. If the payment is not received, then the method 400 moves to step 455.

At step 455 the timing module 211 determines whether the blackout should be ended. For example, the timing module 211 determines whether the blackout should be ended based at least in part on the time rule. If the blackout should not be ended, the method 400 moves to step 450. If the blackout should be ended, then the method 400 moves to step 460.

At step 460 the GUI module 126 determines graphical data for causing the client 120 to display an updated GUI. In one embodiment, the updated GUI includes data indicating that the blackout is ended. At step 465 the asset hosting site 100 transmits the graphical data determined at step 460 to the client 120.

After performing step 445 describing that the asset hosting site 100 transmits the graphical data to the client 120, the method 400 moves to step 470 depicted in FIG. 4C. At step 470 the timing module 211 determines whether the blackout should be ended. For example, the timing module 211 determines whether the blackout should be ended based at least in part on the time rule. If the blackout should not be ended, the method 400 repeats step 470 until the time rule indicates that the blackout should be ended. If the blackout should be ended, then the method 400 moves to step 475. At step 475 the GUI module 126 determines graphical data for causing the client 120 to display an updated GUI. In one embodiment, the updated GUI includes data indicating that the blackout is ended. At step 480 the asset hosting site 100 transmits the graphical data determined at step 475 to the client 120.

In one embodiment, the communication module 201 receives a request for content and the request received by the communication module 201 does not include location data describing the geographic location of the client 120. Instead, the request includes content data identifying the content requested by the client 120. The rules module 205 determines a blackout rule for the content based at least in part on the content data. The rules module 205 determines, based at least in part on the blackout rule associated with the content, whether geographic restrictions apply to the requested content. For example, the blackout rule includes data indicating that the content provider 118 has specified geographic restrictions for the content. If geographic restrictions apply to the requested content the communication module 201 transmits a request to the client 120. The request includes a query for location data describing the geographic location of the client 120. The communication module 201 receives location data describing the geographic location of the client 120. The geolocation module 203 determines the geographic location of the client 120 based at least in part on the location data. The blackout module 207 determines whether to restrict access to the content based at least in part on the geographic location of the client 120 and the blackout rule.

Figure 5A:
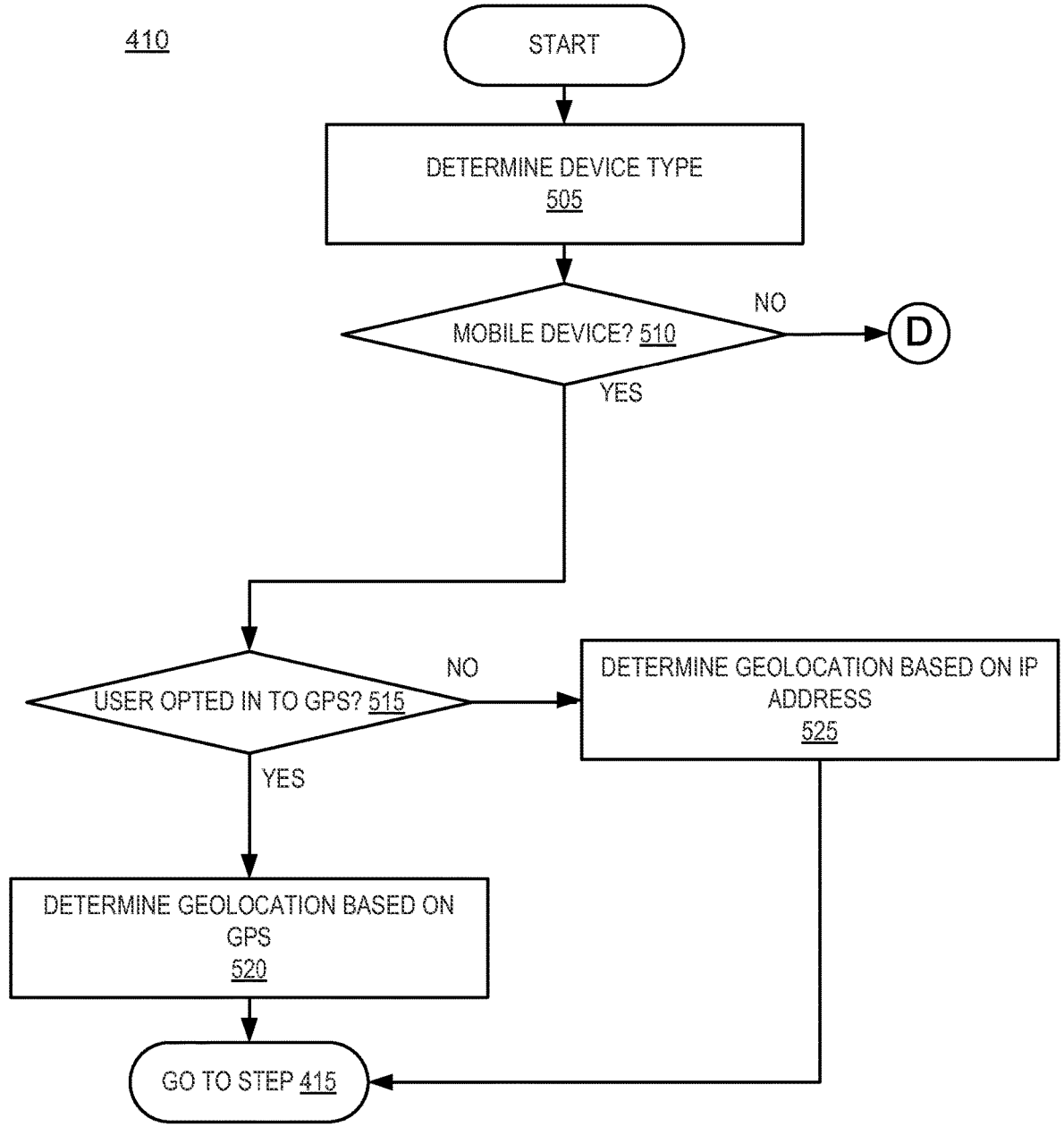
FIGS. 5A and 5B are flow diagrams illustrating a method for determining the geographic location of a client according to one embodiment.
Figure 5B:
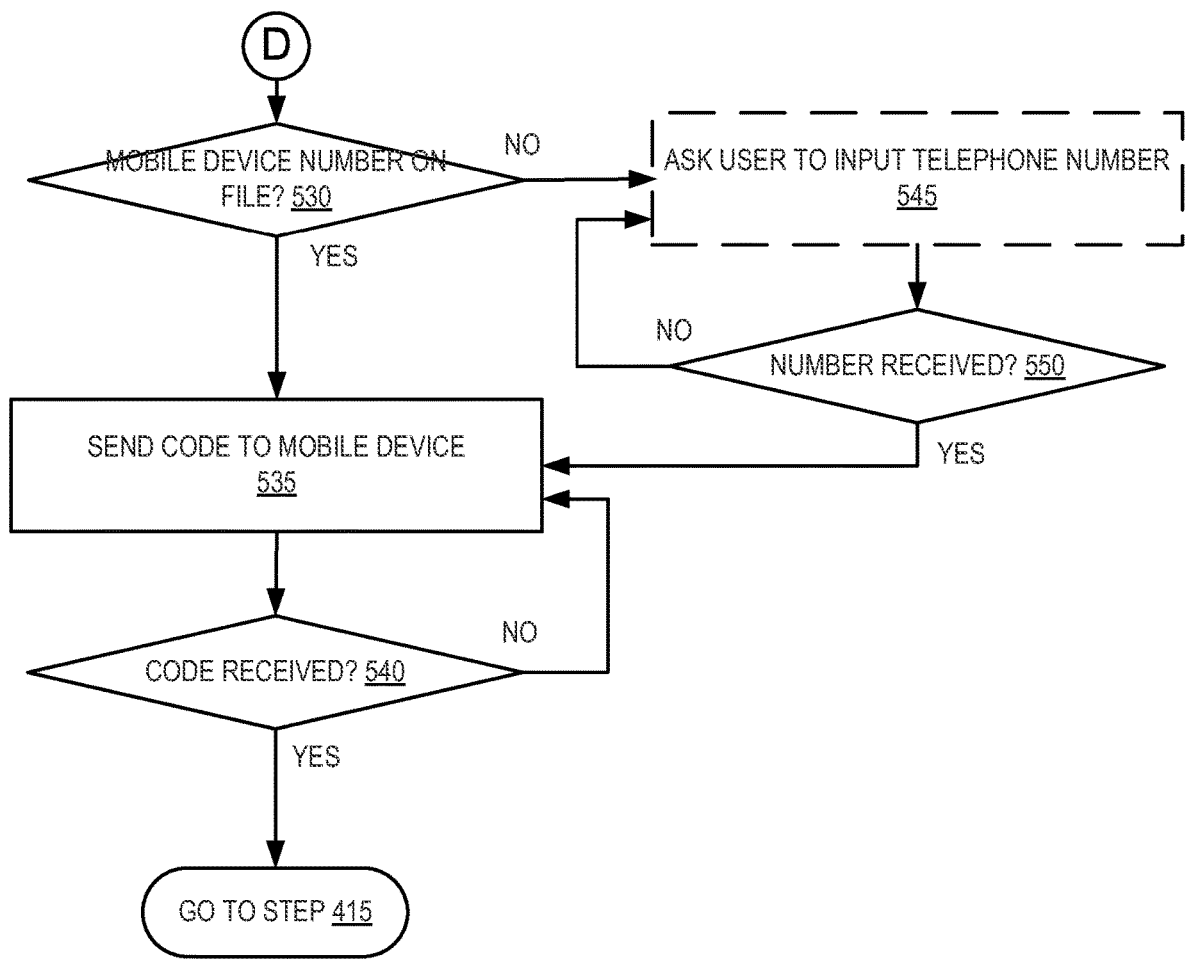

FIGS. 5A and 5B are flow diagrams illustrating further details about the geolocation module 203 determining 410 the geographic location of the browser 193 according to one embodiment. When describing FIGS. 4A, 4B and 4C, this was referred to as step 410. For the purpose of clarity, with reference to FIGS. 5A and 5B this step is referred to as method 410. In one embodiment, the method 410 is beneficial because it prevents users of laptops or desktops from using proxies to thwart the ability of the geolocation module 203 to determine the geographic location of the client 120.

At step 505 the geolocation module 203 determines the device type for the client 120. For example, the geolocation module 203 determines whether the client 120 is a mobile device. If the geolocation module 203 determines that the client 120 is not a mobile device, then the method 410 moves to step 530 depicted in FIG. 5B. Step 530 is described in more detail below with reference to FIG. 5B. If the geolocation module 203 determines that the client 120 is a mobile device, then the method 410 moves to step 515.

At step 515 the geolocation module 203 determines whether the user of the client 120 has opted in to a service that enables the asset hosting site 100 to track the geographic location of the client 120 using GPS coordinates. For example, the client 120 is a GPS-enabled mobile device that has opted in to the Google Latitude™ service and the client 120 transmits location data including GPS coordinates describing the geographic location of the client 120 to the asset hosting site 100. In one embodiment, the location data describing the location of the client 120 is transmitted to the asset hosting site 100 after step 515 and before step 520. The method 410 then moves to step 520. At step 520 the geolocation module 203 determines the geographic location of the client 120 based on the GPS coordinates received from the client 120.

If the geolocation module 203 determines that the user of the client 120 has not opted in to the GPS service then the method 410 moves to step 525. At step 525 the geolocation module 203 determines the geographic location of the client 210 based at least in part on the IP address associated with the client 120.

If at step 510 the geolocation module 203 determines that the client 120 is not a mobile device then the method 410 moves to step 530 depicted in FIG. 5B. At step 530 the geolocation module 203 determines whether a mobile device number (e.g., a mobile phone number) associated with the client 120 is on file. For example, at step 510 the client 120 was determined by the geolocation module 203 to be a laptop or a desktop having a certain identity. The identity is determined, for example, based on the IP address of the client 120 or any other identifier of the client 120. The geolocation database 192 stores identifiers for clients 120. The geolocation database 192 also stores data describing mobile device numbers associated with different clients 120. In one embodiment, the geolocation module 203 queries the geolocation database 192 using the client identifier to determine whether a mobile device number is stored on the geolocation database 192.

If the geolocation database 192 does not have a mobile device number associated with the client 120 on file, then the method 410 moves to step 545. At step 545 the asset hosting site 100 transmits a message to the client 120 requesting that the user of the client 120 reply to the message with their mobile device number. For example, the asset hosting site 100 sends 545 an email or a text message to the client 120 requesting that the client 120 reply to the message with their mobile phone number. At step 550 the geolocation module 203 determines whether the mobile device number is received. If the geolocation module 203 determines that the mobile device number is not received, then the method 410 moves back to step 545. If the geolocation module 203 determines that the mobile device number is received, then the method 410 moves to step 535.

If the geolocation module 203 determines that a mobile device number associated with the client 120 is on file at step 530, then the method 410 moves to step 535. At step 535 the geolocation module 203 sends a code to the mobile device associated with the client 120. For example, the asset hosting site 100 sends a text message including a unique identifier to the mobile device associated with the client 120. The text message includes instructions to reply to the message by entering the unique identifier. At step 540 the geolocation module 203 determines whether the code is received. If the code is not received at step 540, then the geolocation module 203 repeats step 535. If the code is received at step 540, then the method 410 moves to step 515 described above with reference to FIG. 5A. In one embodiment, after step 540 the geolocation module 203 associates the mobile device with the client 120 and stores the association in the geolocation database 192. The geographic location of the mobile device can then be used to determine the geographic location of the client 120 without concern that the client 120 is using a proxy to prevent the geolocation module 203 from determining the actual geographic location of the client 120.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for determining a geographic location of a client device to identify how to provide content to a user of the client device, the method comprising:
   receiving, at a network-based content hosting site, a plurality of content items uploaded by one or more users of a plurality of users;
   storing, by the network-based content hosting site, the plurality of content items for consumption by any user of the plurality of users, the plurality of users comprising the user of the client device, wherein storing the plurality of content items comprises storing metadata associated with the plurality of content items, wherein for each content item of the plurality of content items metadata associated with the respective content item comprises at least one of a content type, an owner, a title, a description, a tag information, or a time length of the respective content item;
   receiving, at the network-based content hosting site, a request for a content item of the plurality of content items from the client device, the request including content data identifying the content item;
   determining, based on the stored metadata, a content type of the content item; and
   responsive to determining that the content type is a live stream:
      determining, by the network-based content hosting site and based on the geographic location of the client device, whether to present the content item to the user of the client device for consumption, wherein determining whether to present the content item to the user for consumption comprises:
         determining, by the network-based content hosting site, whether the client device is a mobile device;
         responsive to determining that the client device is a mobile device, determining a geographic location of the client device based on a navigation system service;
         responsive to determining that the client device is not a mobile device:
            determining that the client device is associated with a mobile device number;
            transmitting a code to a mobile device using the mobile device number associated with the client device;
            responsive to receiving the code back, associating the client device with the mobile device, the received code indicating that the navigation system coordinates of the mobile device are to be used to define the geographic location of the client device; and
            determining the geographic location of the client device based on at least one of the navigation system coordinates of the mobile device or an IP address associated with the client device;
      determining, by the network-based content hosting site, a blackout rule for the content item;
      determining, by the network-based content hosting site, whether to restrict access to the content item based at least in part on the geographic location of the client device and the blackout rule;
      in response to determining that the access to the content item is to be restricted, determining a payment rule specifying that the restriction ends if a payment is received;
      generating, by the network-based content hosting site, graphical data for a graphical user interface (GUI) notifying the user of the client device that the content is restricted and prompting the user to transmit the payment according to the payment rule; and
      upon receiving the payment of the user via the GUI, providing the content item and metadata associated with the content item for presentation to the user on the client device.

2. The method of claim 1, wherein the content data identifies one of a content file or a content stream.

3. The method of claim 1 wherein determining whether to restrict access to the content item based at least in part on the geographic location of the client device and the blackout rule further comprises:
   determining a time rule for the content item based at least in part on the content data and the geographic location of the client device; and
   determining whether to allow access to the content item based at least in part on the time rule.

4. The method of claim 1 wherein determining the geographic location of the client device based on the navigation system service further comprises:

determining whether the client device is opted in to a global positioning system (GPS) service; and responsive to a determination that the client device is opted in to the GPS service, determining the geographic location of the client device based at least in part on the navigation system coordinates describing the geographic location of the client device, wherein the navigation system coordinates comprising GPS coordinates of the client device.

5. The method of claim 1 wherein receiving the code back eliminates a need to determine further that the client device is using a proxy to prevent a determination of the geographic location of the client device.

6. A system for determining a geographic location of a client device to identify how to provide content to a user of the client device, the system comprising:

a processor;

a memory which stores instructions which, when executed by the processor, cause the processor to:

receive, at a network-based content hosting site, a plurality of content items uploaded by one or more users of a plurality of users;

store, by the network-based content hosting site, the plurality of content items for consumption by any user of the plurality of users, the plurality of users comprising the user of the client device, wherein storing the plurality of content items comprises storing metadata associated with the plurality of content items, wherein for each content item of the plurality of content items metadata associated with the respective content item comprises at least one of a content type, an owner, a title, a description, a tag information, or a time length of the respective content item;

receive, at the network-based content hosting site, a request for a content item of the plurality of content items from the client device, the request including content data identifying the content item;

determine, based on the stored metadata, a content type of the content item; and responsive to determining that the content type is a live stream:

determine, by the network-based content hosting site and based on the geographic location of the client device, whether to present the content item to the user of the client device for consumption, wherein determining whether to present the content item to the user for consumption comprises:

determine, by the network-based content hosting site, whether the client device is a mobile device;

responsive to determining that the client device is a mobile device, determine a geographic location of the client device based on a navigation system service;

responsive to determining that the client device is not a mobile device:

determine that the client device is associated with a mobile device number;

transmit a code to a mobile device using the mobile device number associated with the client device;

responsive to receiving the code back, associate the client device with the mobile device, the received code indicating that the navigation system coordinates of the mobile device are to be used to define the geographic location of the client device; and determine the geographic location of the client device based on at least one of the navigation system coordinates of the mobile device or an IP address associated with the client device;

determine, by the network-based content hosting site, a blackout rule for the content item based at least in part on the content data;

determine, by the network-based content hosting site, whether to restrict access to the content item based at least in part on the geographic location of the client device and the blackout rule;

in response to determining that the access to the content item is to be restricted, determine a payment rule specifying that the restriction ends if the payment is received;

generate, by the network-based content hosting site, graphical data for a graphical user interface (GUI) notifying the user of the client device that the content item is restricted and prompting the user to transmit the payment according to the payment rule; and upon receiving the payment of the user via the GUI, provide the content item for presentation to the user on the client device.

7. The system of claim 6, wherein the content data identifies one of a content file or a content stream.

8. The system of claim 6, wherein to determine whether to restrict access to the content item based at least in part on the geographic location of the client device and the blackout rule, the processor is further to:

determine a time rule for the content item based at least in part on the content data and the geographic location of the client device and determine whether to allow access to the content item based at least in part on the time rule.

9. The system of claim 6, wherein to determine the geographic location of the client device on the navigation system service, the processor is further to:

determine whether the client device is opted in to a global positioning system (GPS) service; and in response to a determining that the client device is opted in to the GPS service, determine the geographic location of the client device based at least in part on the navigation system coordinates describing the geographic location of the client device, wherein the navigation system coordinates comprising GPS coordinates of the client device.

10. A computer program product comprising a non-transitory computer readable medium encoding instructions that, in response to execution by a computing device, cause the computing device to perform operations comprising:

receiving, at a network-based content hosting site, a plurality of content items uploaded by one or more users of a plurality of users;

storing, by the network-based content hosting site, the plurality of content items for consumption by any user of the plurality of users, wherein storing the plurality of content items comprises storing metadata associated with the plurality of content items, wherein for each content item of the plurality of content items metadata associated with the respective content item comprises at least one of a content type, an owner, a title, a description, a tag information, or a time length of the respective content item;

receiving, at the network-based content hosting site, a request for a content item of the plurality of content items from a client device, the request including content data identifying the content item;

determining, based on the stored metadata, a content type of the content item; and responsive to determining that the content type is a live stream:

determining, by the network-based content hosting site and based on a geographic location of the client device, whether to present the content item to a user of the client device for consumption, wherein determining whether to present the content item to the user for consumption comprises:

determining, by the network-based content hosting site, whether the client device is a mobile device;

responsive to determining that the client device is a mobile device, determining a geographic location of the client device based on a navigation system service;

responsive to determining that the client device is not a mobile device:

determining that the client device is associated with a mobile device number;

transmitting a code to a mobile device using the mobile device number associated with the client device;

responsive to receiving the code back, associating the client device with the mobile device, the received code indicating that the navigation system coordinates of the mobile device are to be used to define the geographic location of the client device; and determining the geographic location of the client device based on at least one of the navigation system coordinates of the mobile device or an IP address associated with the client device;

determining, by the network-based content hosting site, a blackout rule for the content item;

determining, by the network-based content hosting site, whether to restrict access to the content item based at least in part on the geographic location of the client device and the blackout rule;

in response to determining that the access to the content item is to be restricted, determining a payment rule specifying that the restriction ends if a payment is received;

generating, by the network-based content hosting site, graphical data for a graphical user interface (GUI) notifying the user of the client device that the content is restricted and prompting the user to transmit the payment according to the payment rule, wherein the plurality of users comprising the user; and upon receiving the payment of the user via the GUI, providing the content item for presentation to the user on the client device.

11. The computer program product of claim 10, wherein the content data identifies one of a content file or a content stream.

12. The computer program product of claim 10, wherein determining whether to restrict access to the content item based at least in part on the geographic location of the client device and the blackout rule further comprises:

determining a time rule for the content based at least in part on the content data and the geographic location of the client device; and determining whether to allow access to the content item based at least in part on the time rule.

13. The computer program product of claim 10, wherein determining a geographic location of the client device based on a navigation system service further comprises:

determining whether the client device is opted in to a global positioning system (GPS) service; and responsive to a determination that the client device is opted in to the GPS service, determining the geographic location of the client device based at least in part on the navigation system coordinates describing the geographic location of the client device, wherein the navigation system coordinates comprising GPS coordinates of the client device.

* * * * *